(12) United States Patent
Davies

(10) Patent No.: US 9,957,866 B2
(45) Date of Patent: May 1, 2018

(54) EXHAUST TREATMENT APPARATUS AND METHOD

(71) Applicant: Jaguar Land Rover Limited, Coventry (GB)

(72) Inventor: Michael Davies, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days. days.

(21) Appl. No.: 15/713,256

(22) Filed: Sep. 22, 2017

(65) Prior Publication Data

US 2018/0010501 A1     Jan. 11, 2018

Related U.S. Application Data

(63) Continuation of application No. 15/021,067, filed as application No. PCT/EP2014/069774 on Sep. 17, 2014, now Pat. No. 9,803,526.

(30) Foreign Application Priority Data

Sep. 17, 2013   (GB) .................................. 1316522.0

(51) Int. Cl.
*F01N 3/00* (2006.01)
*F01N 5/04* (2006.01)
(Continued)

(52) U.S. Cl.
CPC ............... *F01N 3/20* (2013.01); *F01N 3/035* (2013.01); *F01N 3/0842* (2013.01); *F01N 3/10* (2013.01);
(Continued)

(58) Field of Classification Search
CPC .. F01N 13/10; F01N 2610/02; F01N 2610/14; F01N 3/035; F01N 3/0842;
(Continued)

(56) References Cited

U.S. PATENT DOCUMENTS 3,644,098 A     2/1972   De Palma et al.
3,881,316 A     5/1975   Bunda et al.
(Continued)

FOREIGN PATENT DOCUMENTS

EP     0 468 919 A1    1/1992
JP     S57-84747 A     5/1982
(Continued)

OTHER PUBLICATIONS

Combined Search and Examination Report, GB 1316522.0, dated Mar. 24, 2014, 8 pages.
(Continued)

*Primary Examiner* — Phutthiwat Wongwian
*Assistant Examiner* — Diem Tran
(74) *Attorney, Agent, or Firm* — Myers Bigel, P.A.

(57) ABSTRACT

The present invention relates to an exhaust treatment apparatus for an internal combustion engine. The apparatus includes a catalyst chamber containing a catalyst. One or more exhaust gas inlets are provided for supplying exhaust gases from the internal combustion engine to the catalyst chamber. An exhaust gas outlet for supplying exhaust gases from the catalyst chamber to a turbocharger. An injection nozzle is provided for introducing a reductant into the exhaust gases between the catalyst and the turbocharger. The reductant and the exhaust gases can undergo mixing as they pass through the turbocharger. The catalyst can have a three-dimensional open structure to facilitate the flow of exhaust gases. The invention also relates to a method of treating exhaust gases from an internal combustion engine.

13 Claims, 3 Drawing Sheets

(51) Int. Cl.
  *F01N 3/10* (2006.01)
  *F01N 1/00* (2006.01)
  *F01N 3/20* (2006.01)
  *F02B 37/00* (2006.01)
  *F02B 1/12* (2006.01)
  *F01N 3/08* (2006.01)
  *F01N 13/10* (2010.01)
  *F01N 3/28* (2006.01)
  *F01N 3/035* (2006.01)

(52) U.S. Cl.
  CPC ......... *F01N 3/106* (2013.01); *F01N 3/2066* (2013.01); *F01N 3/2825* (2013.01); *F01N 13/10* (2013.01); *F02B 1/12* (2013.01); *F02B 37/00* (2013.01); *F01N 2610/02* (2013.01); *F01N 2610/14* (2013.01); *Y02T 10/22* (2013.01); *Y02T 10/24* (2013.01)

(58) Field of Classification Search
  CPC ... F01N 3/20; F01N 3/10; F01N 3/106; F01N 3/2066; F01N 3/2825; F02B 1/12; F02B 37/00; Y02T 10/22; Y02T 10/24
  USPC ............................ 60/295, 301, 302, 303, 323
  See application file for complete search history.

(56) References Cited

U.S. PATENT DOCUMENTS

| | | | |
|---|---|---|---|
| 5,209,062 A | 5/1993 | Vollenweider | |
| 5,306,185 A | 4/1994 | Lassanske et al. | |
| 5,493,859 A | 2/1996 | Shinohara et al. | |
| 8,636,970 B2 * | 1/2014 | Osumi | F01N 13/0093 423/213.2 |
| 2003/0072694 A1 | 4/2003 | Hodgson et al. | |
| 2006/0080953 A1 | 4/2006 | Maus et al. | |
| 2010/0186379 A1 | 7/2010 | Tsujimoto et al. | |
| 2011/0146269 A1 | 6/2011 | Hepburn et al. | |
| 2012/0294786 A1 | 11/2012 | Osumi | |

FOREIGN PATENT DOCUMENTS

| | | |
|---|---|---|
| JP | 10-89054 A | 4/1998 |
| JP | 2004-239109 A | 8/2004 |
| JP | 2011-1829 A | 1/2011 |
| JP | 2011-111945 A | 6/2011 |
| JP | 2013-124555 A | 6/2013 |
| WO | WO 2010/108574 A1 | 9/2010 |
| WO | WO 2013/137309 A1 | 9/2013 |
| WO | WO 2013/172215 A1 | 11/2013 |

OTHER PUBLICATIONS

Notification of Transmittal of the International Search Report and the Written Opinion, PCT/EP2014/069774, dated Mar. 25, 2015, 16 pages.

Communication pursuant to Article 94(3) EPC, EPO Application No. 14766498.1, dated Aug. 25, 2017 (4 pp.).

* cited by examiner

EXHAUST TREATMENT APPARATUS AND METHOD

RELATED APPLICATIONS

This application is a continuation of U.S. patent application Ser. No. 15/021,067, filed Mar. 10, 2016, which itself is a 35 U.S.C. § 371 national stage application of PCT Application No. PCT/EP2014/069774, filed on Sep. 17, 2014, which itself claims priority from Great Britain Patent Application No. 1316552.0 filed on Sep. 17, 2013, the contents of which are incorporated herein by reference in their entireties. The above-referenced PCT International Application was published in the English language as International Publication No. WO 2015/040047 A2 on Mar. 26, 2015.

TECHNICAL FIELD

The present invention(s) relate to an exhaust treatment apparatus for an internal combustion engine; a vehicle; and a method of treating exhaust gases.

BACKGROUND OF THE INVENTION

It is known to provide vehicle having a diesel engine with a diesel aftertreatment system incorporating a diesel oxidation catalyst (DOC). The DOC uses oxygen in the exhaust gases to convert carbon monoxide (CO) to carbon dioxide ($CO_2$); and to convert hydrocarbons (HC) to water ($H_2O$) and ($CO_2$). In order for these reactions to occur efficiently, the catalyst must be heated to above a critical operating temperature, the so-called light-off temperature. However, with a view to improving fuel efficiency and performance, this results in a reduction to exhaust gas temperatures. This results in an increased time period until the catalyst reaches its light-off temperature. It is known to use exhaust heating strategies to reduce the light-off time, but these impact on fuel economy. An alternative approach is to use catalysts having a lower light-off temperature.

A further problem arises when the diesel engine is turbocharged to improve performance. This results in increased thermal inertia of the exhaust system upstream of the DOC along with increased heat extraction. These factors can further delay achieving the light-off temperature of the catalyst.

A further limit on operating temperature arises with urea selective catalytic reduction systems (uSCR) for aftertreatment of nitrogen oxides. A lower temperature limit must be imposed to achieve the required decomposition of urea to ammonia whilst preventing the creation of solid urea deposits. This temperature limit is typically 180° C., but this may not be achieved during certain driving conditions, for example when the vehicle is driven in a city.

Under these operating conditions, the operation of the uSCR system may be restricted due to low diesel exhaust gas temperatures.

The recirculation of exhaust gases to the engine to reduce emission of nitrogen oxides, so called high-pressure exhaust gas recircuation (HP-EGR), can also present problems. The exhaust gases are recirculated from the exhaust manifold to the engine intake manifold, but hydrocarbons and particulates in the exhaust gases can cause contamination and potential durability issues within the engine.

Finally, the packaging of diesel emissions aftertreatment systems, typically including oxidation catalysts (DOC), catalysed diesel particulate filters (cDPF) and uSCR, remains a constant challenge. Current pre-turbocharger catalysts and exhaust gas recirculation catalysts tend to be limited in size due to use of conventional honeycomb structures. The catalysts therefore require additional space and thus may only operate at low speed/load conditions and require an additional post-turbocharger conventional DOC.

It is against this backdrop that the invention(s) described herein have been conceived. At least in certain embodiments, the present invention seeks to overcome or ameliorate at least some of the shortcomings associated with known aftertreatment systems.

SUMMARY OF THE INVENTION

Aspects of the present invention relate to an exhaust treatment apparatus for an internal combustion engine; a vehicle; and a method of treating exhaust gases.

According to an aspect of the present invention there is provided an exhaust treatment apparatus for an internal combustion engine, the apparatus comprising:
- a catalyst chamber containing a catalyst;
- at least one exhaust gas inlet for supplying exhaust gases from the internal combustion engine to the catalyst chamber;
- an exhaust gas outlet for supplying exhaust gases from the catalyst chamber to a turbocharger; and
- an injection nozzle for introducing a reductant into the exhaust gases between the catalyst and the turbocharger.

At least in certain embodiments, the light-off time of the catalyst can be reduced since it is disposed upstream of the turbocharger. The reductant and exhaust gases flow through the turbocharger together and this can promote evaporation and mixing through the turbocharger. The reductant can be introduced at an earlier point in time from cold start or at lower vehicle speeds. The reductant can, for example, be urea which can operatively be introduced into the flow of exhaust gases in an aqueous liquid form.

The mixture of reductant and exhaust gases can subsequently be passed through a selective catalytic reduction (SCR) system or a selective catalytic reduction filter (SCRF) system. The apparatus can be configured to make use of existing packaging space within the vehicle to enable closer coupling of downstream aftertreatment devices (e.g. cDPF, SCR, SCRF) with light-off and packaging benefits.

The catalyst can be carried on, or supported by, a substrate (or support structure). The substrate can define the three-dimensional open structure of the catalyst. The substrate can have a three-dimensional porous nature. By way of example, the substrate can comprise a ceramic foam, a metallic foam or a fibrous structure. The substrate can be fully or partially coated with a catalytic coating (DOC or diesel oxidation and NOx absorption catalyst, DONAC).

The substrate can comprise sintered metal, ceramic fibres, metal fibres, metal foam or ceramic foam. The substrate may be engineered to allow entry of the exhaust gases with reduced or minimal pulsation reflection; and/or to allow reductant injection. The substrate and the catalyst can be canned in a similar manner to conventional catalysts. The application of zoned coatings to the substrate could optionally treat exhaust emissions (DOC); and/or enable hydrolysis of the urea (without oxidation). The porosity of the substrate could vary in different regions of the substrate, for example based on the properties of the zoned coatings.

At least one injection nozzle can open into the catalyst chamber downstream of the catalyst. For example, the catalyst can be disposed in a first region within the catalyst chamber and an injection nozzle can open into a second region of the catalyst chamber. A mixing chamber or cavity can be defined substantially coincident with said injection nozzle. The mixing chamber can facilitate or promote mixing of the reductant with the exhaust gases. The mixing chamber can be formed in the substrate.

The substrate can, for example, have a porous or open cell structure. The substrate can define said first and second regions. The catalyst can be disposed on a first portion of the catalyst support to define said first region. A second portion of the substrate can remain substantially free of said catalyst to define said second region.

The catalyst can have a three-dimensional open structure for facilitating the flow of exhaust gases from said at least one exhaust gas inlet to said exhaust gas outlet.

According to an aspect of the invention there is provided an exhaust treatment apparatus for an internal combustion engine, the apparatus comprising:
 a catalyst chamber containing a catalyst;
 at least one exhaust gas inlet for supplying exhaust gases from the internal combustion engine to the catalyst chamber; and
 an exhaust gas outlet for supplying exhaust gases from the catalyst chamber to a turbocharger;
 wherein the catalyst has a three-dimensional open structure for facilitating the flow of exhaust gases from said at least one exhaust gas inlet to said exhaust gas outlet. The three-dimensional open structure permits the exhaust gases to flow through the catalyst in three dimensions. At least in certain embodiments, the open structure can enable changes in the flow direction of the exhaust gases as they travel through the catalyst chamber.

According to a further aspect of the invention for which protection is sought there is provided an exhaust treatment apparatus for an internal combustion engine, the apparatus comprising:
 a manifold chamber defined by an exhaust manifold and containing a catalyst;
 a plurality of exhaust gas inlets for supplying exhaust gases from the internal combustion engine to the manifold chamber; and
 an exhaust gas outlet for supplying exhaust gases from the catalyst chamber to a turbocharger;
 wherein the catalyst has a three-dimensional open structure for facilitating the flow of exhaust gases from said at least one exhaust gas inlet to said exhaust gas outlet. The three-dimensional open structure permits the exhaust gases to flow through the catalyst in three dimensions. At least in certain embodiments, the open structure can enable changes in the flow direction of the exhaust gases as they travel through the catalyst chamber. Furthermore, the use of a three dimensional open structure may allow conversion to take place in the exhaust gas manifold, without introducing significant back pressure to the engine. This may improve the packaging of the exhaust treatment system, as space within the manifold which would otherwise be empty is utilised for gaseous conversion, and may also lead to a quicker light off, as the distance between the engine cylinders and the catalyst is reduced, which causes the exhaust gas to be hotter when it reaches the catalyst.

The three-dimensional open structure of the catalyst can comprise one of the following: an open cell structure; a porous structure; a granular structure; or a lattice structure. The catalyst can be supported on or carried by a substrate. The substrate can comprise sintered metal, ceramic fibres, metal fibres, metal foam or ceramic foam.

The exhaust treatment apparatus can comprise an injection nozzle for introducing a reductant into the exhaust gases. The injection nozzle can be arranged to introduce the reductant into the exhaust gases between the catalyst and the turbocharger. This arrangement can promote mixing of the exhaust gases and the reductant as they pass through the turbocharger. The reductant can, for example, be urea. A mixing chamber can be disposed coincident with said injection nozzle.

The at least one exhaust gas inlet can be angularly offset from said exhaust gas outlet. In certain embodiments, the exhaust gas outlet can be arranged substantially orthogonal to the at least one exhaust gas inlet.

A recess can be formed in said catalyst (and/or said substrate) substantially coincident with each exhaust gas inlet. The recess(es) can increase the surface area of the catalyst exposed to the incident exhaust gases. This can help to reduce back pressure within the apparatus.

In an embodiment said catalyst may be carried on a substrate, the substrate defining said three-dimensional open structure and substantially filling said manifold chamber.

In another embodiment a recess may be formed in the substrate substantially coincident with said injection nozzle. Introducing the reductant into the substrate may promote evaporation and mixing of the reductant, which may prevent droplets of liquid from impacting on the turbocharger.

In an embodiment a high pressure exhaust gas outlet in fluid communication with said catalyst chamber for recirculating exhaust gases to the internal combustion engine may be provided.

In an embodiment said plurality of exhaust gas inlets may be formed in a sidewall of said exhaust manifold and said exhaust gas outlet is formed in an endwall of said exhaust manifold.

According to an aspect of the invention there is provided an exhaust treatment apparatus for an internal combustion engine, the apparatus comprising:
 a catalyst chamber containing a catalyst;
 at least one exhaust gas inlet for supplying exhaust gases from the internal combustion engine to the catalyst chamber; and
 an exhaust gas outlet for supplying exhaust gases from the catalyst chamber to a turbocharger;
 wherein a recess is formed in said catalyst substantially coincident with each said exhaust gas inlet.

The catalyst can extend circumferentially around each exhaust gas inlet. The respective recesses can extend at least partway through the catalyst. For example, the respective recesses can be a blind hole in the catalyst or could extend through the catalyst to the other side of a catalyst chamber in which the catalyst is disposed.

The recess(es) can each define a surface having a profile which comprises: a cylinder, a cone, a parabolic cone, an elliptical cone, an elliptical tube or a frustum. The recess can have a concave sidewall or a convex sidewall (for example to form a trumpet shape).

The exhaust treatment apparatus described herein can comprise a high pressure exhaust gas outlet in fluid communication with said catalyst chamber for recirculating exhaust gases to the internal combustion engine. At least a portion of the catalyst can be disposed between said at least one exhaust gas inlet and the high pressure exhaust gas outlet. At least in certain embodiments, the catalyst can remove at least some contaminants from the exhaust gases before they are recirculated to the engine intake manifold.

The exhaust treatment apparatus can be in the form of an exhaust manifold. In use, the exhaust manifold can be connected to the internal combustion engine for conveying exhaust gases to the turbocharger. The at least one exhaust gas inlet can be formed in a sidewall of said exhaust manifold. The exhaust gas outlet can be formed in an end wall of said exhaust manifold.

The exhaust manifold can comprise at least one conduit for transporting exhaust gases from an engine cylinder to said at least one exhaust gas inlet. The exhaust manifold can comprise a separate conduit for each engine cylinder. The exhaust manifold can comprise a log exhaust manifold.

The exhaust treatment apparatus can be a diesel aftertreatment apparatus. The catalyst can be a diesel oxidation catalyst (DOC) or a diesel oxidation and nitrogen oxides absorbent catalyst (DO(NA)C) or a lean nitrogen oxide trap catalyst.

According to an aspect of the invention there is provided a vehicle comprising an exhaust treatment apparatus as described herein. The vehicle can also comprise a turbocharger disposed downstream of said catalyst.

According to an aspect of the invention there is provided a method of treating exhaust gases from an internal combustion engine, the method comprising:
- passing the exhaust gases from the internal combustion engine through a catalyst;
- introducing a reductant into the exhaust gases after they have passed through the catalyst; and
- passing the mixture of reductant and exhaust gases through a turbocharger.

According to a further aspect of the invention there is provided a method of manufacture of an exhaust treatment apparatus comprising:
- applying a ceramic washcoat to an open-pore foam;
- heating the ceramic washcoated foam to fire the ceramic and burn off the supporting foam, thereby forming a three-dimensional structure made up of ceramic material;
- applying a catalytic washcoat to the three-dimensional structure; and
- disposing the catalytic washcoated structure in a manifold chamber defined by an exhaust manifold.

Unless indicated to the contrary, the apparatus described herein is not limited to a particular engine configuration. The apparatus can be used in conjunction with internal combustion engines having different configurations, for example I3, I6, V6, V8 internal combustion engines. Internal combustion engines having other cylinder configurations are also contemplated.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying Figures, in which.

DETAILED DESCRIPTION OF AN EMBODIMENT

Figure 1:
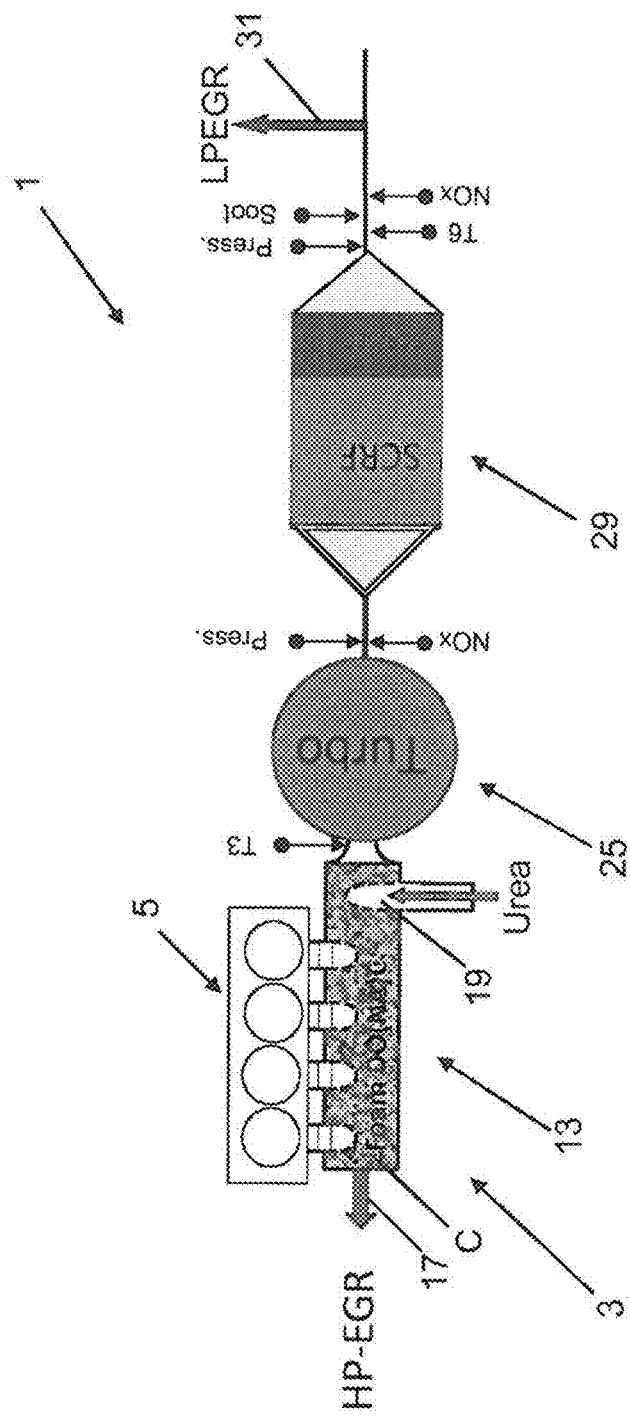
FIG. 1 shows a schematic representation of a pre-turbocharger diesel oxidation catalyst in accordance with an embodiment of the present invention.

A schematic representation of an exhaust aftertreatment apparatus 1 incorporating a pre-turbocharger diesel oxidation catalyst (DOC) 3 in accordance with an embodiment of the present invention is shown in FIG. 1. The DOC 3 according to the present invention is intended for use in an automotive vehicle V having a compression-ignition (diesel) engine 5, as shown schematically in FIG. 2. A cylinder head 7 of the engine 5 is shown schematically in FIG. 3.

The engine 5 in the present embodiment comprises four (4) cylinders 9A-D each having an exhaust outlet (not shown). The exhaust outlets are coupled to respective exhaust gas inlets 11A-D of an exhaust manifold 13 by conduits 15A-D. The exhaust gas inlets 11A-D open into a catalyst chamber C defined by the exhaust manifold 13. The exhaust manifold 13 also comprises a high pressure return line 17, a reductant injection nozzle 19 and an outlet port 21. The high-pressure return line 17 recirculates high-pressure exhaust gases to the cylinders 9A-D thereby providing high pressure exhaust gas recirculation (HP-EGR) to reduce nitrogen oxide (NOx) emissions.

The injection nozzle 19 is coupled to a supply of reductant 23 (which in the present embodiment is aqueous urea, but could be gaseous ammonia). A typical aqueous urea is AdBlue®. In use, the reductant 23 is introduced in a liquid form into the flow of exhaust gas where it is vaporised and decomposes to form ammonia ($NH_3$) and carbon dioxide ($CO_2$). The mixture of reductant 23 and exhaust gas then exits the exhaust manifold 13 through the outlet port 21.

The outlet port 21 is connected to a turbocharger 25 which is driven by the exhaust gases to provide forced induction for the engine 5 in conventional manner. The reductant 23 and exhaust gas are mixed further as they pass through the turbocharger 25. A combined selective catalytic reduction (SCR) and diesel particular filter (DPF) is provided downstream of the turbocharger 25 in the form of a selective catalytic reduction filter (SCRF) 29. It will be appreciated that the SCR and the DPF could be provided as separate modules. A low pressure return line 31 is connected downstream of the SCRF 29 to provide low pressure exhaust gas recirculation (LPEGR). A conventional silencer or muffler (not shown) is typically provided downstream of the low pressure return line 31, for example disposed at the rear of the vehicle V. It will be appreciated that not all engines utilise LPEGR and the low pressure return line 31 can be omitted in certain embodiments.

Figure 3:
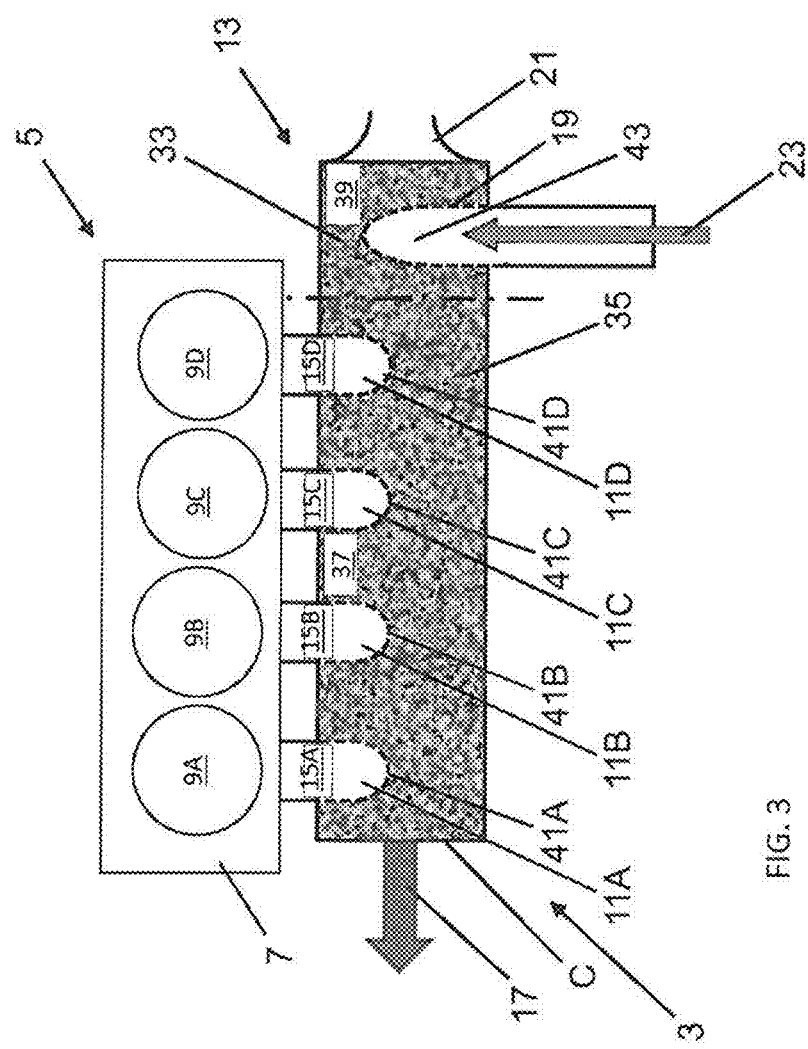
FIG. 3 shows an enlarged schematic representation of the diesel oxidation catalyst shown in FIG. 1.

The DOC 3 in accordance with the present embodiment will now be described in more detail with reference to FIG. 3. A substrate 33 is disposed in the manifold chamber C for supporting a catalytic material in the form of an oxidation catalyst 35. The substrate 33 has a three dimensional open structure (or matrix) which defines a large surface area for promoting catalytic reactions. The three dimensional open structure permits the flow of exhaust gases in three dimensions. This arrangement accommodates a change in direction of the exhaust gases. As illustrated in FIGS. 1 and 3, the exhaust gases undergo a substantially 90° change in direction as they travel from the exhaust gas inlets 11A-D to outlet port 21.

The substrate 33 has a porous structure to permit the passage of exhaust gases through the exhaust manifold 13. The substrate 33 can, for example, comprise an open cell structure having uniform or non-uniform cell sizes. Alternatively, the substrate 33 can have a fibrous, lattice or granular structure arranged to support the catalyst 35 whilst maintaining flow passageways for the exhaust gases.

The substrate 33 can, for example, be formed from one or more of the following materials: sintered metals, ceramics fibres, metal fibres, ceramic foams or metal foams. The catalyst 35 could be formed by applying a ceramic washcoat (or slurry) to an open-pore foam and heating the structure to fire the ceramic and burn off the supporting foam. The resulting structure has a three dimensional structure made up of the ceramic material. A catalytic washcoat can then be applied to the three dimensional structure. Alternatively the substrate could be made directly of the catalytic material. At least in certain embodiments, the substrate 33 can substantially fill the manifold chamber C. Indeed, the volume of the manifold chamber C can optionally be increased over that of a conventional exhaust manifold to accommodate the substrate 33.

The substrate 33 can be a ceramic substrate, such as monolithic cordierite. The substrate 33 could be divided into first and second regions 37, 39 arranged in sequence: the first region 37 being disposed upstream of the second region 39 (with reference to the flow of exhaust gases through the DOC 3). In the present embodiment, the catalyst 35 is provided only on the substrate 33 in the first region 37. The catalyst 35 can be applied to the substrate 33 by zone coating, for example. Alternatively, the first and second regions 37, 39 could be defined by separate porous members. A partition plate could optionally be provided to separate the first and second regions 37, 39 within the substrate 33. If urea injection was not performed in the exhaust manifold 13, the second region 39 could be omitted. In this arrangement, the first region 37 could be extended, for example to just upstream of the turbocharger 25.

The catalyst 35 can comprise a precious metal, such as platinum, palladium or rhodium. The catalyst 35 can optionally be selected also to function as a nitrogen oxides (NOx) absorbent, thereby functioning as a diesel oxidation and nitrogen oxides absorbent catalyst (DO(NA)C). The catalyst 35 can be applied as a coating to the substrate 33. For example, the substrate 33 can be coated with a high surface area washcoat having platinum group metals (PGMs) deposited onto it in a highly dispersed manner. The washcoat can also contain materials to promote the catalytic function of the PGMs, to assist in maintaining the high surface area dispersion of the PGM and also to provide storage functions for the pollutants.

The first region 37 of the substrate 33 could comprise four recesses in the form of apertures 41A-D extending partway through the substrate and aligned with the respective exhaust gas inlets 11A-D. In the present embodiment, the apertures 41A-D define a female surface which defines an elliptical cone, but other configurations can be implemented. The apertures 41A-D increase the surface area of the substrate 33 exposed to each exhaust gas inlet 11A-D and can help to reduce backpressure in the exhaust manifold 13. The second region 39 comprises a mixing chamber 43 (defined by a recess formed in the substrate 33) which is aligned with the injection nozzle 19 through which the reductant 23 is introduced. The reductant 23 and the exhaust gases mix together within the mixing chamber 43 before exiting the exhaust manifold 13 through the outlet port 21. In normal use, the reductant 23 remains within the second region 39 of the substrate 33 (i.e. does not contaminate the first region 37), thereby avoiding degradation of the urea in the first region 37 due to a chemical reaction between the reductant 23 and the precious metals in the catalyst 35 (which would otherwise occur when the operating temperature reaches approximately 180° C.). The flow of exhaust gases through the exhaust manifold 13 can help to prevent or inhibit migration of the reductant 23 from the second region 35 to the first region 37.

The operation of the DOC 3 will now be described with reference to the accompanying Figures. When the engine 5 is initially started, the DOC 3 achieves a light-off (operating) temperature more quickly than conventional catalysts as it is disposed closer to the engine 5. The DOC 3 can thereby begin to perform oxidation more quickly than conventional catalysts. The exhaust gases from the engine 5 are introduced into the exhaust manifold 13 from each cylinder 9A-D through the respective exhaust gas inlets 11A-D. The exhaust gases are introduced into the exhaust manifold 13 in a series of pulses dependent on the operating cycle of each cylinder within the engine 5. These pulses help to circulate the exhaust gases through the substrate 33. The substrate 33 can help to suppress noise radiation from the exhaust manifold 13 caused by the exhaust gas pulses.

The exhaust gases enter the apertures 41A-D formed in the substrate 33 and then travel through its open pore structure. By positioning the catalyst 35 within the exhaust manifold 13, the required light-off (operating) temperature can be achieved more quickly than conventional catalysts. The catalytic treatment of the exhaust gases can thereby occur over a wider range of operating conditions. The catalyst 35 uses oxygen to convert carbon monoxide (CO) and carbonaceous particulate matter in the exhaust gases to carbon dioxide ($CO_2$); and hydrocarbons (HC) in the exhaust gases to water ($H_2O$) and $CO_2$. The substrate 33 and/or the catalyst 35 can also function to clean exhaust gases prior to recirculation through the high-pressure return line 17. At least some of the hydrocarbons and particulates in the exhaust gases can be removed within the exhaust manifold 13, thereby helping to reduce the build-up of contaminants in the engine 5, for example on valves, when the exhaust gas is recirculated to the engine 5 through the high-pressure return line 17.

As outlined above, the reductant 23 is introduced into the mixing chamber second region 39 as a liquid from the injection nozzle 19. For example, the reductant 23 can be an aqueous solution of urea. The reductant 23 is vaporised in the mixing chamber 43 and mixes with the exhaust gases. This arrangement ensures that the reductant 23 is not exposed to catalyst 35 which would potentially promote the formation of nitrogen oxides (NOx). In prior art systems, the reductant 23 is introduced downstream of the turbocharger 25. However, in the present embodiment, the reductant 23 is introduced upstream of the turbocharger 25 resulting in increased mixing with the exhaust gases as they travel through the turbocharger 25. The efficacy of the reductant 23 in removing nitrogen oxides (NOx) on the downstream SCR(F) catalyst from the exhaust gases can potentially be increased. At least in certain embodiments, it is not necessary to provide a separate urea mixer which might otherwise result in an unwanted backpressure increase. Furthermore, the SCRF 29 can be moved closer to the turbocharger 25 as it is not necessary to introduce the reductant 23 into the exhaust gases between these components and allow it to evaporate and mix with the exhaust gas prior to the SCR(F) catalyst.

The catalyst 35 within the catalyst chamber C may accumulate carbonaceous particulates over a period of time but can be regenerated periodically by employing a conventional regeneration strategy. The exhaust manifold 13 can be an assembly, for example consisting of first and second components, to enable the catalyst 35 to be replaced. Alternatively, the exhaust manifold 13 can have a sealed construction. The catalyst 35 could be formed inside the exhaust manifold 13.

The SCRF 29 disposed downstream of the turbocharger 25 functions in conventional manner to convert nitrogen oxides (NOx) in the exhaust gases into nitrogen ($N_2$) and water ($H_2O$). During this process, the reductant added upstream of the turbocharger 25 is absorbed onto a catalyst in the SCRF 29. Some of the exhaust gases downstream of the SCRF 29 are recirculated to the internal combustion engine 5 through the low pressure return line 31 in known manner.

Figure 2:
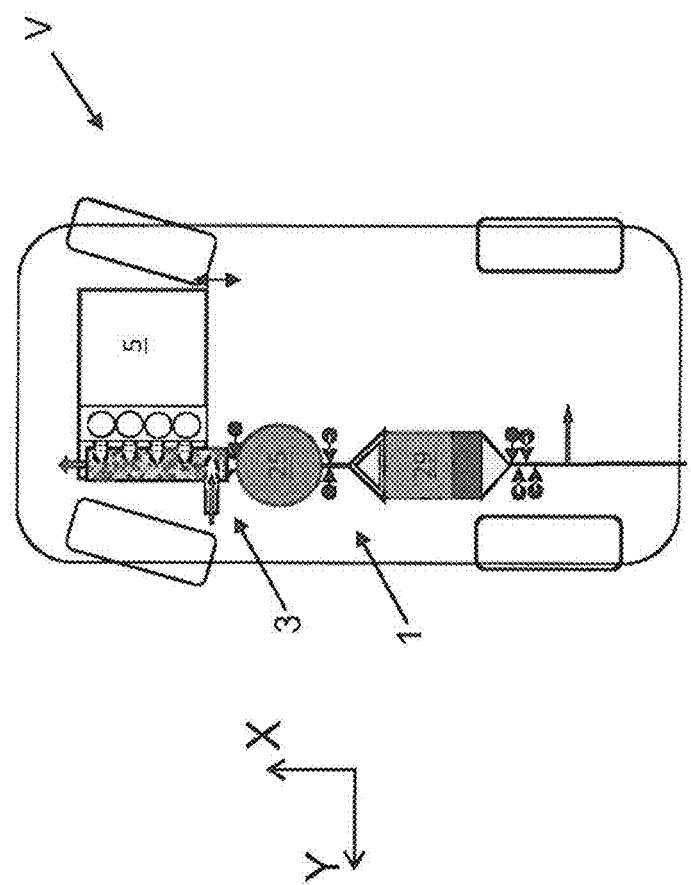
FIG. 2 shows a schematic representation of a vehicle incorporating the pre-turbocharger diesel oxidation catalyst according to the present invention.

FIGS. 1, 2 and 3 are intended merely to provide schematic representations of the apparatus 1. Notably, the positioning of the apparatus 1 within the vehicle V, as shown in FIG. 2, is not necessarily representative of a production arrangement. A possible arrangement would be to position the SCRF 29 within the engine bay, for example in front of the vehicle dashboard/pedals (not shown).

It will be appreciated that various changes and modifications can be made to the embodiment described herein without departing from the present invention. Notably, the DOC 3 has been described with reference to a diesel engine 5, but a similar apparatus could be incorporated into a gasoline engine. A three-way catalyst is typically employed in a gasoline engine in place of the DO(NA)C 35. Nonetheless, the benefits associated with locating the catalyst within the exhaust manifold 13 are also relevant. Notably, the reduced time to achieve a light-off (operating) temperature for the catalyst 35 may help to reduce emissions, at least under certain conditions.

A modification to the embodiment described herein would be to omit introduction of the reductant 23 into the exhaust manifold 13. For example, the first and second regions 37, 39 could be combined and catalyst applied to substantially all of the substrate 33 in the exhaust manifold 13.

The apparatus 1 described herein could also be used in non-turbocharged engines 5. At least in certain embodiments, the positioning of the catalyst 35 in proximity to the engine 5 would prove advantageous.

Further aspect of the present invention will become apparent with reference to the following numbered paragraphs:

1. An exhaust treatment apparatus for an internal combustion engine, the apparatus comprising:
    a catalyst chamber containing a catalyst;
    at least one exhaust gas inlet for supplying exhaust gases from the internal combustion engine to the catalyst chamber;
    an exhaust gas outlet for supplying exhaust gases from the catalyst chamber to a turbocharger; and
    an injection nozzle for introducing a reductant into the exhaust gases between the catalyst and the turbocharger.

2. An exhaust treatment apparatus as described in paragraph 1, wherein said injection nozzle opens into said catalyst chamber downstream of the catalyst and upstream of the turbocharger.

3. An exhaust treatment apparatus as described in paragraph 1, wherein a mixing chamber is provided substantially coincident with said injection nozzle.

4. An exhaust treatment apparatus as described in paragraph 1, wherein the catalyst has a three-dimensional open structure for facilitating the flow of exhaust gases from said at least one exhaust gas inlet to said exhaust gas outlet.

5. An exhaust treatment apparatus for an internal combustion engine, the apparatus comprising:
    a catalyst chamber containing a catalyst;
    at least one exhaust gas inlet for supplying exhaust gases from the internal combustion engine to the catalyst chamber; and
    an exhaust gas outlet for supplying exhaust gases from the catalyst chamber to a turbocharger;
    wherein the catalyst has a three-dimensional open structure for facilitating the flow of exhaust gases from said at least one exhaust gas inlet to said exhaust gas outlet.

6. An exhaust treatment apparatus as described in paragraph 5, wherein the three-dimensional open structure of the catalyst comprises one of the following: an open cell structure; a porous structure; a granular structure; or a lattice structure.

7. An exhaust treatment apparatus as described in paragraph 5, comprising an injection nozzle for introducing a reductant into the exhaust gases between the catalyst and the turbocharger.

8. An exhaust treatment apparatus as described in paragraph 1, wherein said at least one exhaust gas inlet is angularly offset from said exhaust gas outlet.

9. An exhaust treatment apparatus as described in paragraph 1, wherein a recess is formed in said catalyst substantially coincident with each exhaust gas inlet.

10. An exhaust treatment apparatus for an internal combustion engine, the apparatus comprising:
    a catalyst chamber containing a catalyst;
    at least one exhaust gas inlet for supplying exhaust gases from the internal combustion engine to the catalyst chamber; and
    an exhaust gas outlet for supplying exhaust gases from the catalyst chamber to a turbocharger;
    wherein a recess is formed in said catalyst substantially coincident with each said exhaust gas inlet.

11. An exhaust treatment apparatus as described in paragraph 1, comprising a high pressure exhaust gas outlet in fluid communication with said catalyst chamber for recirculating exhaust gases to the internal combustion engine.

12. An exhaust treatment apparatus as described in paragraph 1, wherein the apparatus is in the form of an exhaust manifold.

13. An exhaust treatment apparatus as described in paragraph 12, wherein said at least one exhaust gas inlet is formed in a sidewall of said exhaust manifold and said exhaust gas outlet is formed in an endwall of said exhaust manifold. 14. An exhaust treatment apparatus as described in paragraph 12, wherein said exhaust manifold comprises at least one conduit for communicating exhaust gases from a cylinder in said internal combustion engine to said at least one exhaust gas inlet.

15. An exhaust treatment apparatus as described in paragraph 1, wherein the apparatus is a diesel aftertreatment apparatus; and said catalyst is a diesel oxidation catalyst (DOC) or a diesel oxidation nitrogen oxides absorbent catalyst (DO(NA)C) or a lean NOx trap or a three-way catalyst.

16. A vehicle comprising an exhaust treatment apparatus as described in paragraph 1.

17. A vehicle as described in paragraph 16 comprising a turbocharger disposed downstream of said catalyst.

18. A method of treating exhaust gases from an internal combustion engine, the method comprising:

passing the exhaust gases from the internal combustion engine through a catalyst; introducing a reductant into the exhaust gases after they have passed through the catalyst; and passing the mixture of reductant and exhaust gases through a turbocharger.

The invention claimed is:

1. An exhaust treatment apparatus for an internal combustion engine, the apparatus comprising:
   a manifold chamber defined by an exhaust manifold;
   a catalyst contained in the exhaust manifold and carried on a substrate;
   a plurality of exhaust gas inlets for supplying exhaust gases from the internal combustion engine to the manifold chamber;
   an exhaust gas outlet for supplying exhaust gases from the manifold chamber to a turbocharger; and
   a plurality of recesses in the substrate, each of said recesses comprising an aperture extending partway through the substrate coincident with one of said exhaust gas inlets;
   wherein the substrate has a three-dimensional open structure for facilitating a flow of exhaust gases from the exhaust gas inlets to the exhaust gas outlet.

2. The exhaust treatment apparatus of claim 1, wherein the three-dimensional open structure of the substrate comprises one of the following: an open cell structure, a porous structure, a granular structure, or a lattice structure.

3. The exhaust treatment apparatus of claim 1, further comprising an injection nozzle for introducing a reductant into the exhaust gases between the catalyst and the turbocharger.

4. The exhaust treatment apparatus of claim 1, wherein at least one of the exhaust gas inlets is angularly offset from the exhaust gas outlet.

5. The exhaust treatment apparatus of claim 1, wherein the substrate fills the manifold chamber.

6. The exhaust treatment apparatus of claim 5, further comprising an injection nozzle for introducing a reductant into the exhaust gases between the catalyst and the turbocharger, wherein a recess is formed in the substrate substantially coincident with the injection nozzle.

7. The exhaust treatment apparatus of claim 1, further comprising a high pressure exhaust gas outlet in fluid communication with the manifold chamber for recirculating exhaust gases to the internal combustion engine.

8. The exhaust treatment apparatus of claim 1, wherein the plurality of exhaust gas inlets are formed in a sidewall of the exhaust manifold and the exhaust gas outlet is formed in an endwall of the exhaust manifold.

9. The exhaust treatment apparatus of claim 1, wherein the at least one exhaust gas inlet is formed in a sidewall of the exhaust manifold and the exhaust gas outlet is formed in an endwall of the exhaust manifold.

10. The exhaust treatment apparatus of claim 1, wherein the exhaust manifold comprises at least one conduit for communicating exhaust gases from a cylinder in the internal combustion engine to the at least one exhaust gas inlet.

11. The exhaust treatment apparatus of claim 1, wherein the apparatus is a diesel aftertreatment apparatus, and wherein the catalyst is a diesel oxidation catalyst (DOC) or a diesel oxidation nitrogen oxides absorbent catalyst (DO(NA)C) or a lean NOx trap or a three-way catalyst.

12. A vehicle comprising an exhaust treatment apparatus as claimed in claim 1.

13. The vehicle of claim 12, wherein the vehicle comprises the turbocharger, wherein the turbocharger is disposed downstream of said catalyst.

* * * * *